J. LLOBET & J. GIMENEZ.
YOKE.
APPLICATION FILED JULY 22, 1910.

1,051,841.

Patented Jan. 28, 1913.

WITNESSES:
George Bambay
P. A. Hoster

INVENTORS
Juan Llobet
Juan Gimenez
BY Munn & Co.
ATTORNEYS

UNITED STATES PATENT OFFICE.

JUAN LLOBET AND JUAN GIMENEZ, OF HABANA, CUBA.

YOKE.

1,051,841. Specification of Letters Patent. Patented Jan. 28, 1913.

Application filed July 22, 1910. Serial No. 573,200.

*To all whom it may concern:*

Be it known that we, JUAN LLOBET and JUAN GIMENEZ, citizen of Porto Rico and subject of Spain, respectively, and residents of Habana, Cuba, have invented a new and Improved Yoke, of which the following is a full, clear, and exact description.

The invention relates to yokes, and has for an object to provide a yoke for draft animals such as oxen and the like, to enable the animal to more easily carry a load attached to the yoke.

For the purpose mentioned use is made of a main stem adapted to turnably engage the shaft or tongue of a vehicle, a main bearing body mounted to swing on the main stem, auxiliary bearings on the main bearing body, and head bows mounted to swing on the auxiliary bearings.

Reference is to be had to the accompanying drawings constituting a part of this specification, in which similar characters of reference denote corresponding parts in all the views and in which—

Figure 1:
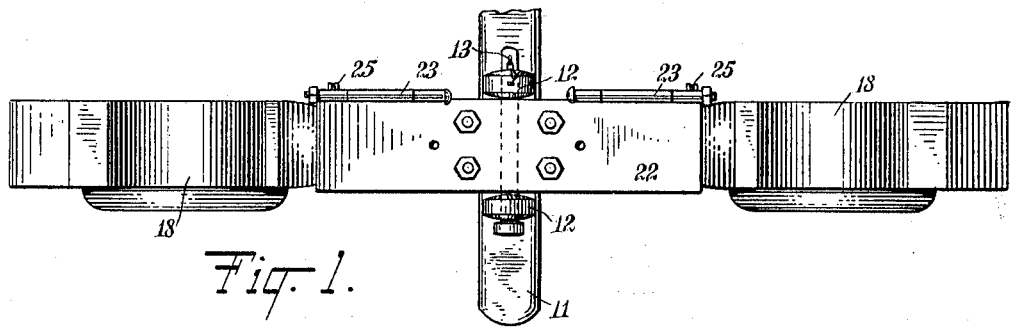
Figure 2:
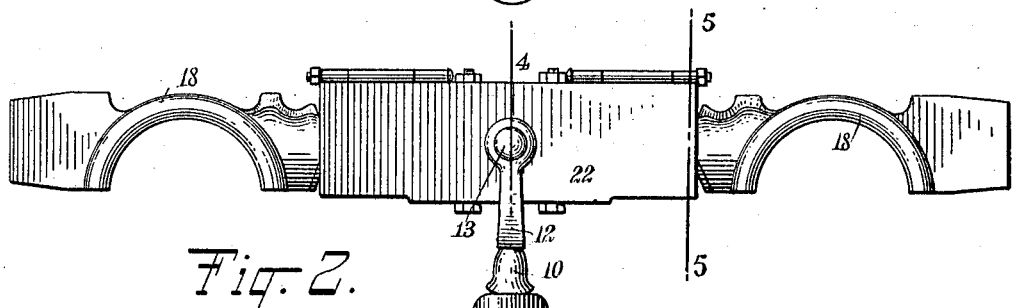
Figure 3:
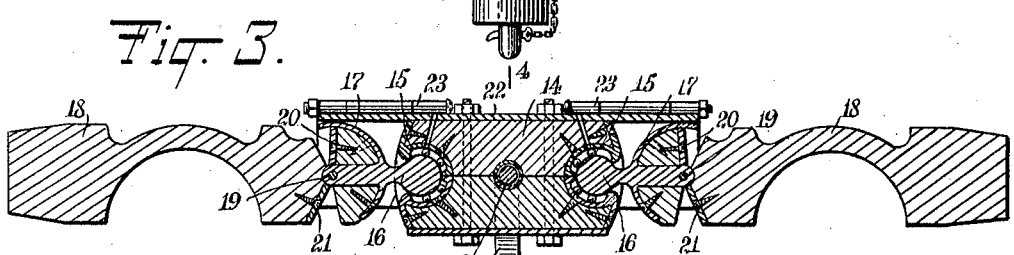
Figures 4, 5:
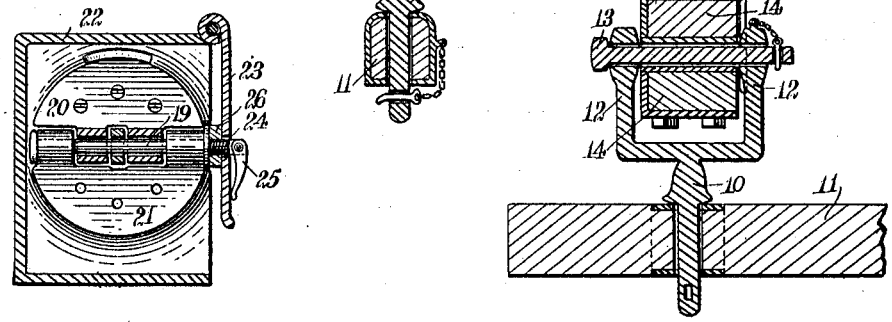

Figure 1 is a plan view of our device; Fig. 2 is a front elevation of the same; Fig. 3 is a longitudinal sectional view disclosing the various operative parts; Fig. 4 is a sectional view taken on the line 4—4 in Fig. 2; and Fig. 5 is a sectional view of one of the hinged connections and taken on the line 5—5 in Fig. 2.

Referring more particularly to the various views, we employ a main stem 10, adapted to turnably engage a shaft 11 of a vehicle such as a cart or the like. The main stem preferably has two spaced arms 12, and mounted to swing thereon by means of a rod 13, is a bearing body 14. The bearing body 14 is provided with two preferably circular openings having ball bearings 15 therein, and mounted to turn in the openings are auxiliary bearings 16. The auxiliary bearings 16 have curved bearing surfaces 17, and hingedly mounted on the bearings 16 are head bows 18, adapted to extend outwardly from the bearings, as will be easily seen by referring to Fig. 2. Each auxiliary bearing 16 can swing forward and rearward; up and down to a certain extent, and can be turned on its longitudinal axis in the ball bearings 15, as stated above.

The connection between the auxiliary bearing 16 and the head bow 18 consists of a rod 19, mounted to hingedly connect the plates 20 and 21, of which the plate 20 is a part of the auxiliary bearing 16 and the plate 21 is a part of the head bow 18. A casing 22 constitutes a part of the bearing body 14 and hingedly mounted on the casing is a cover 23, provided with a hole 24 through which the rod 19 projects, a locking catch 25 being provided on the rod to releasably hold the cover 23 in closed position. When the hinged cover 23 is turned down so that the hole 24 therein fits over the outer end of the rod 19, it will hold the corresponding auxiliary bearing 16 against being tilted up and down or swung to the front or rear, the cover 23 being held in its locking position by means of the catch 25. By lifting the cover 23 so as to disengage it from the end of the rod 19, and then turning down the catch 25 so that the cover will be supported by the outer side of this catch in disengaged relation with respect to the rod 19, the auxiliary bearing 16 will be left free to move any way that is permitted by its pivotal connection to the main body 14. Adjacent the inner side of the cover 23 a nut 26 is held on the rod 19 to keep the cover 23 conveniently spaced from the adjacent end of the auxiliary bearing.

In the operation of our device, if for any reason the head bow should be lifted, it will swing on the auxiliary bearing body 16 and the main bearing 14, thus permitting the head bow to constantly remain in a horizontal position and snugly fit the head of the draft animal.

With our device applied to an animal, a greater load can be pulled by the animal, as the load pulls directly on the head bows, and by having the same remain in one position at all times the animal can more easily haul the load.

The bows 18 are connected to the head or horns of the animal, and not to the neck.

Any suitable means, such as cords or chains, may be used to latch the head bow and the head of the draft animal together.

Although for the purpose of more clearly describing our device we have shown a particular construction, it will be understood that the scope of our invention is defined in the appended claims.

Having thus described our invention, we claim as new and desire to secure by Letters Patent:

1. A yoke comprising a main stem, means for supporting the same in upright position, a main bearing body mounted to swing on the main stem, an auxiliary bearing mounted to swing on the main bearing body, and a head bow mounted to swing on the auxiliary bearing.

2. A yoke comprising a main stem, a main bearing body mounted to swing on the main stem, an auxiliary bearing mounted to swing on the main bearing body, a head bow mounted to swing on the auxiliary bearing, and means for locking the auxiliary bearing.

3. A yoke comprising a stem, means for pivotally connecting said stem to the tongue or main shaft of a vehicle, and a main bearing body pivotally connected to the said stem and mounted to swing about an axis at an angle to said stem.

4. A yoke comprising a stem, means for rotatably connecting said stem in a vertical position with the tongue or main shaft of a vehicle, and a main bearing body pivotally connected by means of a horizontal axis with said stem.

5. A yoke comprising a stem, means for rotatably connecting said stem in a vertical position with the tongue or main shaft of a vehicle, a forked bearing carried by the said stem, a horizontal pivot spindle carried by said bearing, and a main bearing body loosely mounted on said horizontal pivot spindle.

6. A yoke comprising a main bearing body, a head bow, pivotal means connecting the head bow to the bearing body, said means permitting the head bow to swing forward and rearward relatively to the vehicle on which the yoke is used, and means for locking said head piece against said forward and rearward movement.

7. A yoke comprising a main bearing body, a head bow, pivotal means connecting the head bow to the bearing body, for allowing the head bow to rotate around an axis, and means for locking the head bow against rotative movement.

8. A yoke comprising a main bearing body, a head bow, pivotal means connecting the main body and the head bow, for permitting the head bow to swing upward and downward, and means for locking the head bow against movement.

9. A yoke comprising a main bearing body, an auxiliary bearing, pivotal means connecting the auxiliary bearing to the main body, said means being mounted to permit the auxiliary bearing to swing toward the front and rear of the main body, and a head bow connected to the auxiliary bearing.

10. A yoke comprising a main bearing body, an auxiliary bearing, pivotal means connecting the auxiliary bearing to the main body, for permitting the auxiliary bearing to swing toward the front and rear of the main body, a head bow connected to the auxiliary bearing, and means for locking said auxiliary bearing against movement.

11. A yoke comprising a main bearing body, an auxiliary bearing, pivotal means connecting the auxiliary bearing to the main body, for permitting the auxiliary bearing to swing upward and downward, a head bow connected to the auxiliary bearing, and means for locking said auxiliary bearing against movement.

12. A yoke comprising a main bearing body, an auxiliary bearing, pivotal means connecting the auxiliary bearing to the main body, for permitting the auxiliary bearing to rotate around an axis, a head bow connected to the auxiliary bearing, and means for locking the bearing against movement.

13. A yoke comprising a main bearing body, an auxiliary bearing, a universal joint connecting the end of the main bearing body and the auxiliary bearing together, a head bow pivotally connected to said auxiliary bearing, and locking means for preventing the auxiliary bearing from swinging up or down, or to the front and rear.

14. A yoke comprising a main bearing body, an auxilary bearing, pivotal means connecting the auxiliary bearing to the main body, said means being mounted to permit the auxiliary bearing to swing toward the front and rear of the main body, a head bow and pivotal means connected to the auxiliary bearing and to the head bow and mounted to permit the head bow to swing upward and downward.

15. A yoke comprising a main bearing body, an auxiliary bearing, pivotal means connecting the auxiliary bearing to the main body, said means being mounted to permit the auxiliary bearing to swing upward and downward, a head bow and pivotal means connected to the auxiliary bearing and to the head bow and mounted to permit the head bow to swing upward and downward on the auxiliary bearing.

16. A yoke comprising a main bearing body, an auxilary bearing, pivotal means connecting the auxiliary bearing to the main body, for permitting the auxiliary bearing to rotate around an axis, a head bow, and pivotal means connected to the auxiliary bearing and to the head bow at one end thereof and mounted to permit the head bow to swing upward and downward.

17. A yoke comprising a main bearing body, an auxiliary bearing, a universal joint connecting the end of the main bearing body and the auxiliary bearing together, and a head bow pivotally connected to said auxiliary bearing to swing upward and downward.

In testimony whereof we have signed our names to this specification in the presence of two subscribing witnesses.

JUAN LLOBET.
JUAN GIMENEZ.

Witnesses:
SILVERIO CRESP,
FRANCISCO SALINAS.

Copies of this patent may be obtained for five cents each, by addressing the "Commissioner of Patents, Washington, D. C."